US012071916B2

(12) United States Patent
Rolandson

(10) Patent No.: US 12,071,916 B2
(45) Date of Patent: Aug. 27, 2024

(54) INTERNAL COMBUSTION ENGINE WITH A FUEL REFORMER AND EXHAUST GAS RECIRCULATION

(71) Applicant: Volvo Car Corporation, Gothenburg (SE)

(72) Inventor: Ola Rolandson, Vänersnäs (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/128,329

(22) Filed: Mar. 30, 2023

(65) Prior Publication Data

US 2023/0313759 A1 Oct. 5, 2023

(30) Foreign Application Priority Data

Apr. 4, 2022 (EP) .................................... 22166554

(51) Int. Cl.
*F02M 21/02* (2006.01)
*F02B 43/10* (2006.01)
*F02B 43/12* (2006.01)

(52) U.S. Cl.
CPC ......... *F02M 21/0206* (2013.01); *F02B 43/10* (2013.01); *F02B 43/12* (2013.01)

(58) Field of Classification Search
CPC .... F02M 21/0206; F02M 25/12; F02M 26/50; F02M 26/36; F02M 25/038; F02M 26/07; F02M 26/14; F02B 43/10; F02B 43/12; F02D 19/0655; F02D 19/0671; F01N 5/02
See application file for complete search history.

(56) References Cited

U.S. PATENT DOCUMENTS

2009/0035192 A1 2/2009 Hwang
2019/0323458 A1* 10/2019 Voice ........................ C01B 3/48

FOREIGN PATENT DOCUMENTS

AT 521165 B1 11/2019
AT 522812 B1 * 4/2021 ............... F02G 5/02
CN 113646515 A * 11/2021 .............. F02B 51/02
EP 2048339 A1 4/2009
JP 3618312 B2 * 2/2005

OTHER PUBLICATIONS

Sep. 23, 2022 European Search Report issued in corresponding EP Application No. 22166554.

* cited by examiner

*Primary Examiner* — Hung Q Nguyen
(74) *Attorney, Agent, or Firm* — Clements Bernard Walker; Christopher L. Bernard

(57) ABSTRACT

An internal combustion engine assembly includes a fuel tank, connected via a fuel supply duct to a first fuel inlet of a cylinder, the cylinders with an outlet connected to an exhaust system. Exhaust gases from the exhaust system are in heat exchanging contact with a reformer unit for steam reforming of alcohol, the reformer unit being with a reformer outlet connected to a to a second fuel inlet of the cylinders for supplying hydrogen to the second fuel inlet. An alcohol evaporator is in heat exchanging contact with the exhaust gases. A water evaporator is in heat exchanging contact with the exhaust gases. A reformer purge duct extends from the exhaust system to the inlet of the reformer unit via a purge control valve, adapted for feeding exhaust gases into the reformer unit and via the reformer outlet to the second fuel inlet of the cylinders.

17 Claims, 5 Drawing Sheets

INTERNAL COMBUSTION ENGINE WITH A FUEL REFORMER AND EXHAUST GAS RECIRCULATION

CROSS-REFERENCE TO RELATED APPLICATION

The disclosure claims the benefit of priority of co-pending European Patent Application No. 22166554.0, filed on Apr. 4, 2022, and entitled "Internal combustion engine with a fuel reformer and exhaust gas recirculation," the contents of which are incorporated in full by reference herein.

TECHNICAL FIELD

The disclosure relates to an internal combustion engine assembly including a fuel tank, connected via a fuel supply duct to a first fuel inlet of at least one of a number of cylinders, the cylinders being with an outlet connected to an exhaust system, exhaust gases from the exhaust system being in heat exchanging contact with a reformer unit for steam reforming of alcohol, the reformer unit being with a reformer outlet connected to a second fuel inlet of the cylinders for supplying hydrogen to the second fuel inlet.

BACKGROUND

Fuel for internal combustion engines (ICE) may contain varying amounts of ethanol. Bio-ethanol may constitute 10% (E10) to 85% (E85) of Bio-fuel mixtures. Fuel of the type E10 is at present used in 14 countries in Europe and increasing use of Bio-ethanol is part of the goal to reduce the dependency of fossil fuels.

As currently available Biofuels can only account for a part of the reduction in $CO_2$ emissions, the increase in efficiency of the ICE is of importance. One method for increasing the thermal efficiency of the ICE includes Waste Heat Recovery in combination with Fuel Reforming technology. Fuel reforming uses the heat available in the exhaust gases to upgrade a low carbon fuel to a higher energy level hydrogen fuel that is combusted, with a higher thermal efficiency of the ICE as a result.

Steam reforming of ethanol requires a relatively large amount of energy, and the temperature that is required for full conversion of ethanol is about 700K. It is known to provide an aqueous ethanol solution to a reformer that is heated by the high-temperature exhaust gases. In the reformer, syngas, consisting of CO and $H_2$ is formed that is fed to a separator that cools the mixed gas, condense water vapor, and separates into gas and liquid. A recovery tank collects recovery solution separated by the separator, and hydrogen is fed to the cylinders of the ICE.

Hydrogen is highly reactive and ignites at surface temperatures of 450° C. at concentration levels between 5% and 95%. This makes safe handling of the hydrogen system a major concern for fuel reform WHR to be an applied in an ICE.

It is an object to provide a combustion engine assembly that is at least partly powered by alcohol, such as bio-ethanol, using steam reforming of the alcohol with improved safety.

SUMMARY

A combustion engine assembly is provided, including an alcohol evaporator that is in heat exchanging contact with the exhaust gases and that is with an inlet connected to an alcohol supply unit and with an outlet connected to a first reformer supply duct that is connected to an inlet of the reformer unit via a first control valve, for supplying alcohol steam to the reformer unit, a water evaporator that is in heat exchanging contact with the exhaust gases and that is with an inlet connected to a water tank and that is with an outlet connected to a second reformer supply duct that is connected to the inlet of the reformer unit via a second control valve for supplying water steam to the reformer unit, a reformer purge duct extending from the exhaust system to the inlet of the reformer unit via a purge control valve, adapted for feeding exhaust gases into the reformer unit and via the reformer outlet to the second fuel inlet of the cylinders.

At start of the engine, the exhaust gases are recirculated as an inert purging gas containing $N_2$ and $CO_2$, to remove oxygen entrapped in the fuel reformer unit and other parts of the hydrogen gas system.

The alcohol supply unit may include the fuel tank that is adapted for containing alcohol.

The alcohol supply unit may include a tank for containing alcohol. The outlet of the fuel evaporator can be connected to the tank via a condenser. The alcohol steam that is formed during the exhaust gas recirculation is collected in the tank.

The reformer outlet may be connected to a buffer tank for storing reformed fuel, the buffer tank being with an outlet connected to the second fuel inlet of the cylinders.

The alcohol can include ethanol, such as bio ethanol and/or ethanol included in type E10-E85 fuel.

A cooler may be provided in the exhaust purge duct so that the exhaust gases may be cooled prior to purging to a temperature of between 100° C.-200° C.

The first reformer supply duct may be connected to an alcohol recirculation duct via a pressure control valve that opens at a pressure exceeding a predetermined threshold value, the recirculation duct being connected to the exhaust system, upstream of the reformer unit, or to the tank.

When sufficient pressure of ethanol steam has been built up, the ethanol steam may be removed via the exhaust system via the pressure control valve, until sufficient water steam has been formed for the reforming process to start. The ethanol steam can also be condensed and collected in the tank.

The ethanol outflow duct may be connected to the exhaust system upstream of the reformer to enable combustion using excess air that is injected and use this for pre-heating of the substrate of the reformer unit.

By recondensing the ethanol into liquid and recycling it into the tank until the reforming process starts, the fuel efficiency is increased.

The second reformer supply duct may be connected to a water outflow duct that is connected to the exhaust system, via a pressure control valve that opens at a pressure exceeding a predetermined threshold value, or that is connected to the water tank via a pressure control valve and a condenser.

Until sufficient water steam is present, the water can be recirculated to the exhaust system via the pressure control valve.

The water outflow duct may be connected to the exhaust system downstream of the reformer unit, to enable recirculation of the water until the reformer unit starts and water steam is used in the process.

The water outflow duct may be connected to the exhaust system, via a pressure control valve that opens at a pressure exceeding a predetermined threshold value or may be connected to the water tank via a pressure control valve and a condenser.

The water can also be recirculated via the condenser back into the water tank, so that all water is utilized in the reforming process.

When sufficient water steam pressure has been built up, the purge control valve is closed and the second control valve passing water steam into the reformer is opened so that exhaust gases are flushed out of the reformer, the buffer tank, and the cylinders by the water steam, to avoid coke forming of ethanol in the hot fuel reformer.

An ejector-shaped nozzle may be provided at the second fuel inlet of the cylinders. The recirculated exhaust gases may during the purging step be injected into the inlet ports of the cylinders via an ejector-shaped nozzle, for instance by a Port Fuel Injection (PFI) system. The purging gas ensures that no oxygen is present in the system from start to end before the reforming process starts and $H_2$ is formed.

The system of the present disclosure may:

- enable the evaporation of ethanol steam until a preset pressure and temperature are reached, using the pressure control (release) valve to recirculate the ethanol steam while waiting for remaining process conditions to be available,
- enable the evaporation of water steam to a preset pressure and temperature using a pressure control (release) valve to recirculate the water steam while waiting for the temperature of the fuel reformer unit to reach the correct value,
- use chilled exhaust gas (EGR) as an inert purging gas to eliminate oxygen entrapped in the fuel reformer unit and hydrogen gas system,
- use an ejector shaped nozzle (PFI) in the ICE inlet ports to drive the EGR gas through system,
- switch from the exhaust gas to water steam to prime the fuel reformer unit with only water steam to avoid the risk of coking at start up, and
- open the ethanol steam valve and fuel reforming process starts in excess of water steam.

The internal combustion engine assembly may include a controller that is adapted to carry out a start sequence including:

- starting combustion of fuel in the cylinders,
- opening of the purge control valve to flow exhaust gases through the reformer unit, the buffer tank, and the cylinders for removal of $O_2$,
- start producing of alcohol steam and water steam until the pressures in the first and second reformer supply ducts reach a respective predetermined value,
- closing of the purge control valve and opening of the second control valve to flow water steam through the reformer unit and the buffer tank, and
- opening the first control valve to start the process of fuel reforming in the reformer unit.

The start sequence may involve:

- starting of the engine and reaching a stable lambda 1 operation, ensuring that no oxygen in present in the exhaust gas by use of the lambda sensor,
- opening of the EGR valve to purge the system from oxygen with cold inert ($N_2$ and $CO_2$) exhaust gas while waiting for steam. The lambda sensor may be used to ascertain that $H_2$ gas system is purged completely,
- starting of the ethanol supply pump and allowing the ethanol steam pressure to increase until the release valve opens at a preset pressure. The ethanol steam is recirculated to the exhaust upstream of the catalyst, or back into the tank, until the amount of water steam that has been produced is sufficient,
- starting the water pump and creating an increase in steam pressure until the steam release valve opens at a preset pressure. The water steam is recirculated to exhaust, or via a condenser, back into the water tank, until the temperature in the reformer is sufficient to start the reforming process,
- closing of the EGR valve and opening of the water steam valve first to avoid coking of ethanol in the hot fuel reformer, and
- opening of the ethanol steam valve to enable fuel reformer process to start.

Upon stopping the engine, the controller that is adapted to carry out a stop sequence including:

- closing the first control valve,
- recirculating ethanol steam via the pressure control valve to the exhaust system or to the storage tank,
- closing the second control valve after a predetermined time,
- recirculating water steam via the pressure control valve to the exhaust system or to the water tank,
- opening the purge control valve and recirculating exhaust gases through the reformer unit and the buffer tank, and
- stopping the combustion of fuel in the cylinders.

The stop sequence may involve:

- closing the ethanol steam valve first for the fuel reforming process to stop. The remaining steam pressure is recirculated to the exhaust upstream of the catalyst, or back into the ethanol tank until the pressure is reduced,
- closing of the water steam valve after a set time period to ensure full conversion of remaining ethanol in the hot fuel reformer unit. The remaining steam pressure is recirculated to the exhaust or to the water tank until the pressure is reduced,
- opening of the EGR valve and purging the hydrogen until it has been fully burned in the ICE,
- lowering the mass flow of the ethanol pump and lowering of the ethanol steam pressure until the ethanol release valve closes and the pump can be stopped,
- lowering of the water pump mass flow and lowering of the water steam pressure until the water release valve closes and pump can be stopped, and
- stopping of the engine when the purging has removed remaining hydrogen from the system.

BRIEF DESCRIPTION OF THE DRAWINGS

A number of embodiments will by way of non-limiting example be described in detail with reference to the accompanying drawings. In the drawings.

DETAILED DESCRIPTION

Figure 1:
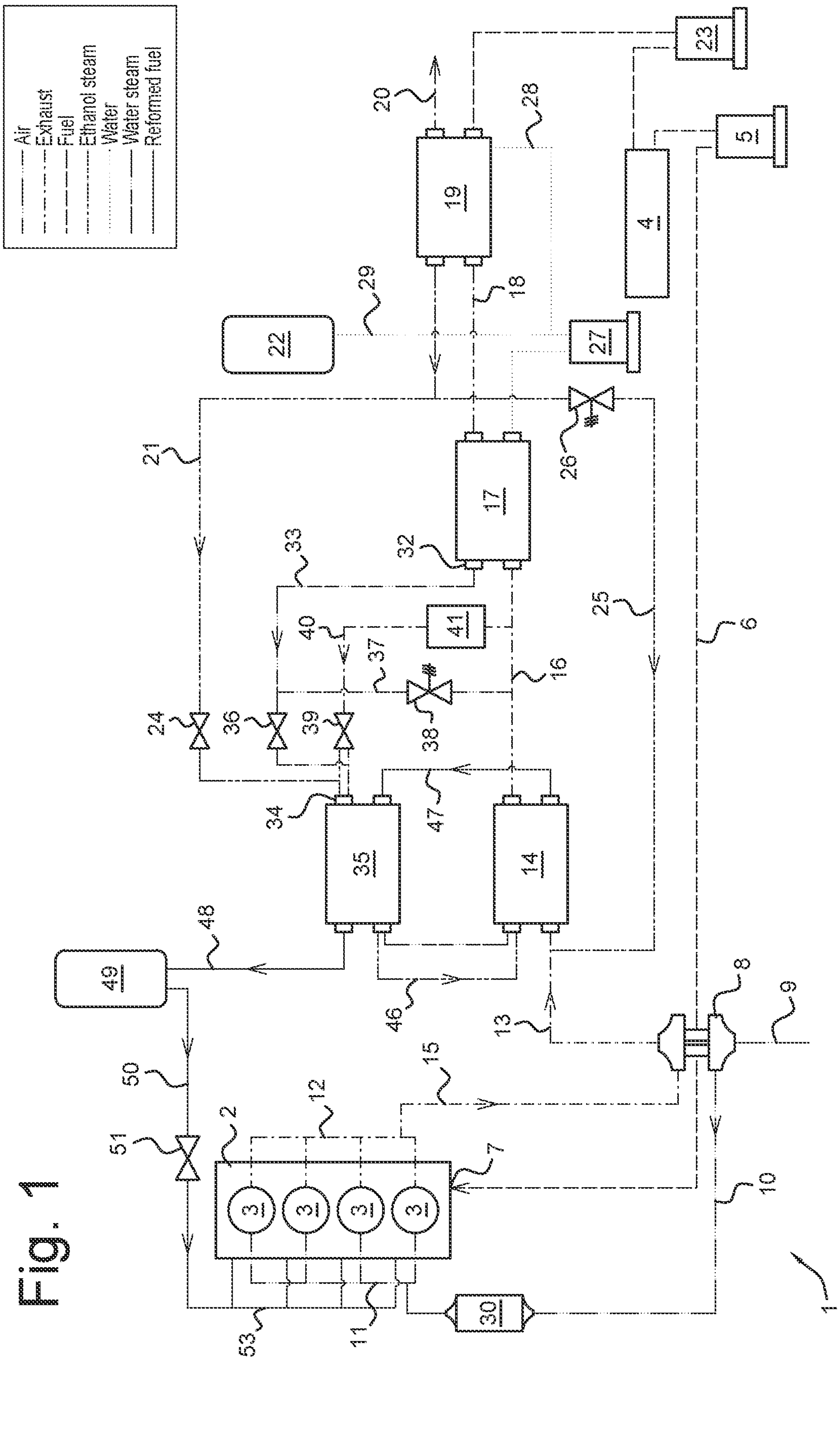
FIG. 1 shows a schematic overview of an internal combustion engine (ICE) assembly including an ethanol steam reforming unit.

FIG. 1 shows an internal combustion engine assembly 1 with an internal combustion engine 2 having four cylinders 3. A fuel tank 4 containing alcohol, such as bioethanol, for instance in the form of an E10 type of fuel, is connected to a fuel inlet 7 of the cylinders 3 via a fuel pump 5 and a fuel supply duct 6.

A turbocharger 8 compresses the air that is supplied from an air intake 9 and transports the intake air through an air duct 10 to the intake manifold 11, via a cooler 30 for supply to the cylinders 3. The exhaust gases of the fuel that has been burned in the cylinders 3, leave the engine 2 via an exhaust manifold 12 and flow through an exhaust duct 15 to drive the turbocharger 8. After passing the turbocharger 8, the exhaust gases pass via the duct 13 into an integrated catalytic converter/fuel reformer unit 14. Via an exhaust duct 16, the exhaust gases pass to a water evaporator 17 and from there via an exhaust duct 18 to a fuel evaporator/water condenser unit 19 that includes fuel evaporator element and a water condenser element. On leaving the fuel evaporator/water condenser unit 19, the exhaust gases pass to a tail pipe 20 to be expelled into the ambient.

A second fuel pump 23 supplies biofuel from the tank 4 to the fuel evaporator/water condenser unit 19 where the fuel, that is at ambient temperature, is brought in heat exchanging contact with the exhaust gases. The ethanol that is evaporated from the fuel, is supplied via a duct 21 and a control valve 24 to an inlet 34 of a pre-heater/cooler unit 35. The outlet of the fuel evaporator unit 19 is connected to the exhaust duct 13 via a recirculation duct 25 and a regulating pressure release valve 26.

In the fuel evaporator/water condenser unit 19, water is condensed from the exhaust gases and is stored in a water tank 22 that stores the water which is supplied via a condensate drain and water outlet duct 28, a water pump 27 and a duct 29.

The water that has been condensed in the unit 19 and/or that is supplied from the water tank 22 by the pump 27, is evaporated in the water evaporator 17 and is passed as steam to the outlet 32. Through a water steam supply duct 33 and a control valve 36, the water steam enters into a pre-heater/cooler unit 35. The water steam supply duct 33 is connected to the exhaust duct 16 via a recirculating duct 37 and a regulating valve 38.

The inlet 34 of the unit 35 is connected to the exhaust duct 16 via an exhaust gas recirculation (EGR) control valve 39, a duct 40 and a cooler 41. At the inlet 34 of the pre-heater/cooling unit 35, the ethanol and water steam are mixed, the mass ratio being controlled by the mass flows of the pumps 23 and 27. The pre-heated water steam and ethanol steam mixture is fed from the unit 35 to the integrated catalytic converter/fuel reformer unit 14 through duct 46, in which reformer unit 14 the water and steam are transformed into syngas.

The syngas that is formed in the integrated catalytic converter/fuel reformer unit 14 and that includes $H_2$, is transported via a syngas outlet duct 47, through the pre-heater/cooler unit 35 and preheats the water and ethanol by being brought in heat exchanging contact with the water/ethanol steam that is supplied at the inlet 34.

Via an outlet duct 48, the cooled syngas is supplied to a buffer tank 49 in which it is stored in compressed form. From the buffer tank 49, the syngas is transported via a gas supply duct 50 and a reduction valve 51 to a gas inlet manifold 53 that is connected to the cylinders 3.

EGR Purge

Figure 2:
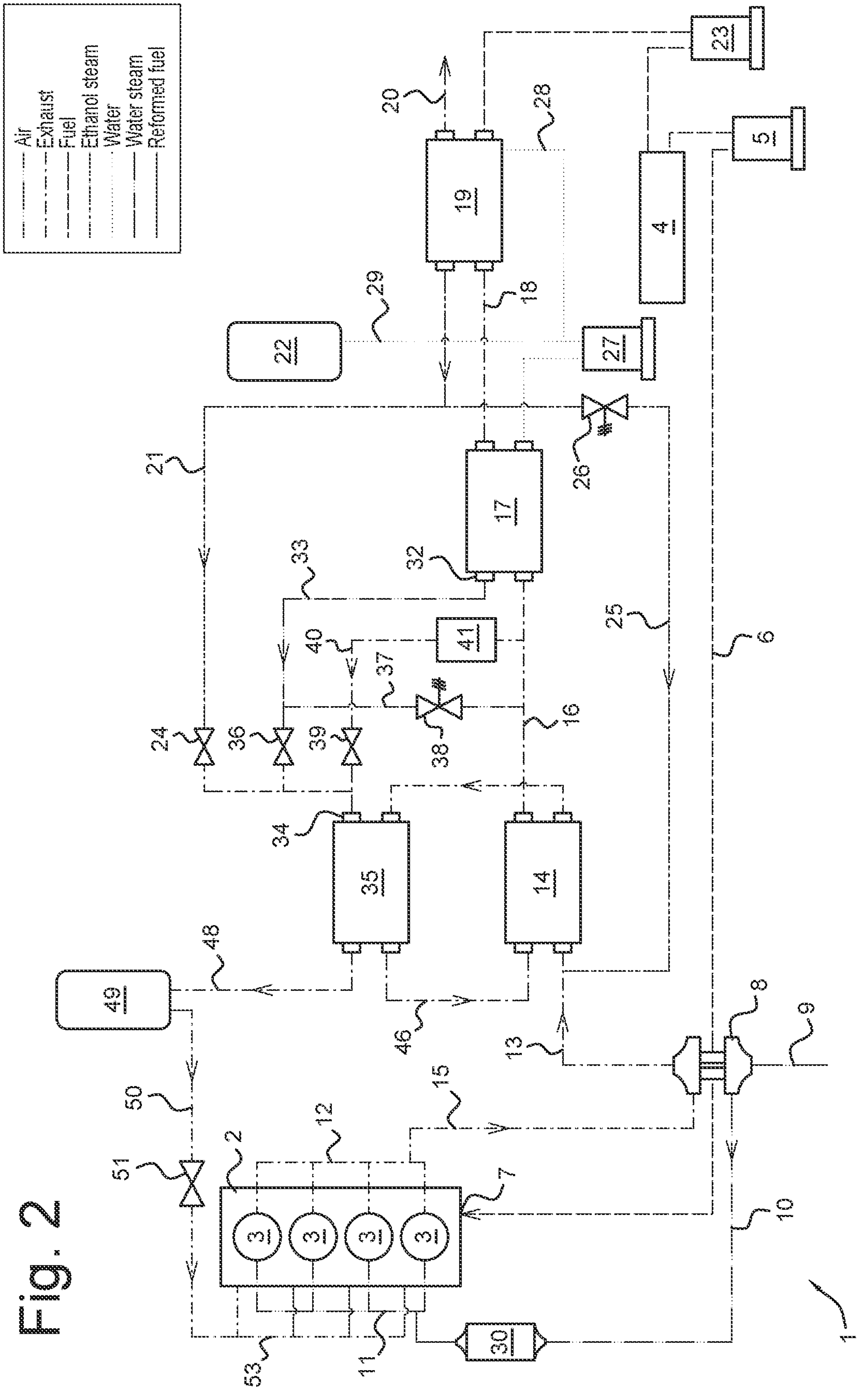
FIG. 2 shows the step of purging hydrogen gas from the system by exhaust gas recirculation (EGR)

FIG. 2 shows the use of chilled exhaust gas (EGR) as an inert purging gas to eliminate oxygen entrapped in the fuel reformer unit 14 and in the hydrogen gas system including the heat exchanger 35, the buffer tank 49, the duct 51, the gas inlet manifold 53 and the turbocharger 8.

At the start of the engine 2, the EGR control valve 39 is opened while the ethanol steam control valve 24 and water steam control valve 36 are closed. First, chilled exhaust gas is supplied to the gas inlet 53 and to the cylinders 3 to evacuate oxygen in the ICE crank case before the start of $H_2$ production, to eliminate the risk of $H_2$ piston blow by. The EGR control valve 39 is opened at the moment the lambda sensor measures a stable value of lambda=1, which ensures that no oxygen is present in the exhaust gases.

Figure 5:
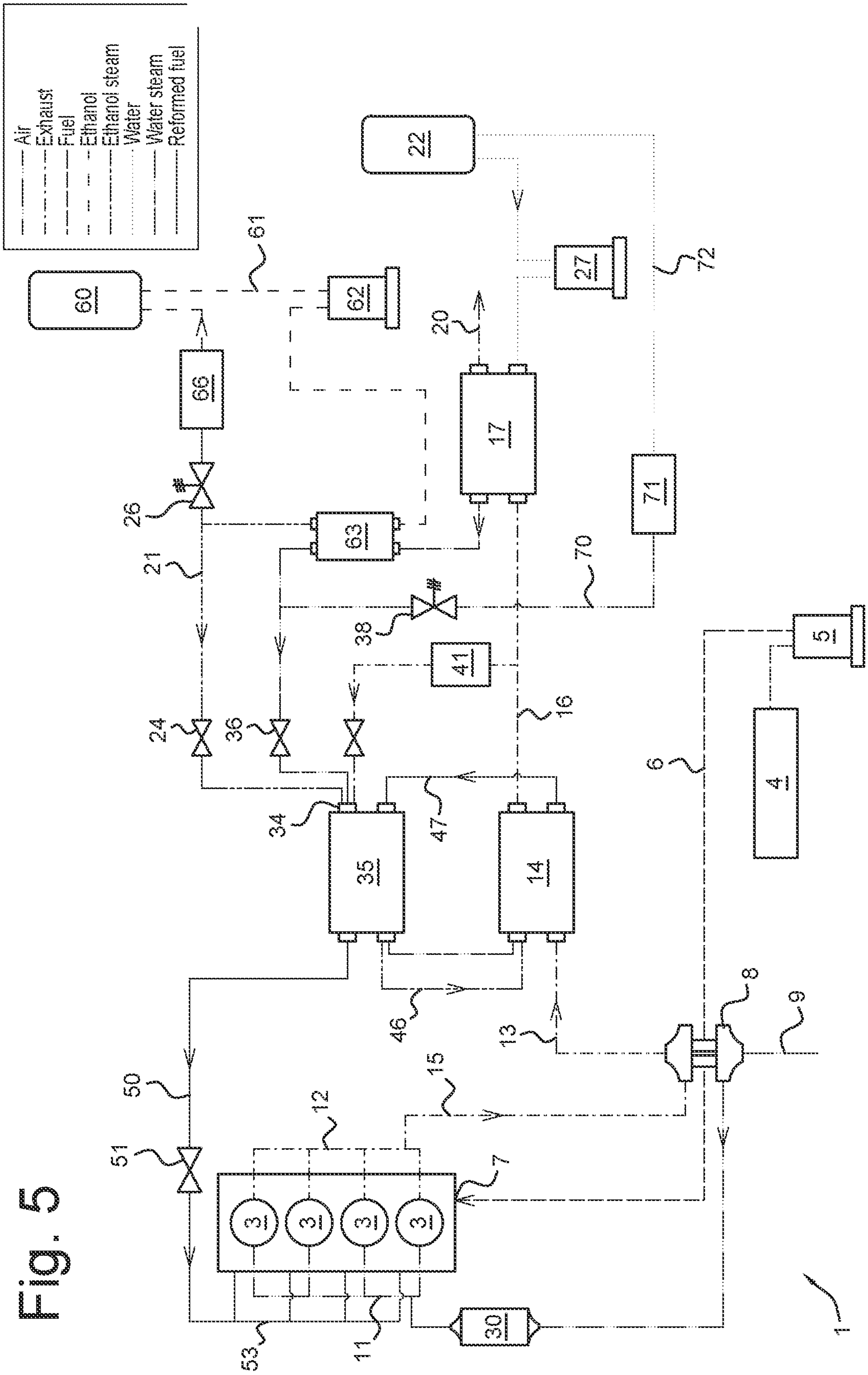

The water steam that is generated in the water evaporator 17 increases the pressure in the recirculation duct 37, causing pressure release of the regulating valve 38, which valve opens at a pressure of between 5-10 bar. The water steam is fed into the exhaust duct 16 or can be recirculated into the water tank 22, as shown in the embodiment of FIG. 5.

The ethanol steam that is generated in fuel evaporator 19 increases the pressure in the recirculation duct 25, causing pressure release of the regulating valve 26, which valve opens at a pressure of between 5-10 bar. The ethanol steam is fed into the exhaust duct 13 or can be recirculated into a separate tank, as is shown in the embodiment of FIG. 5.

Water Steam Priming

Figure 3:
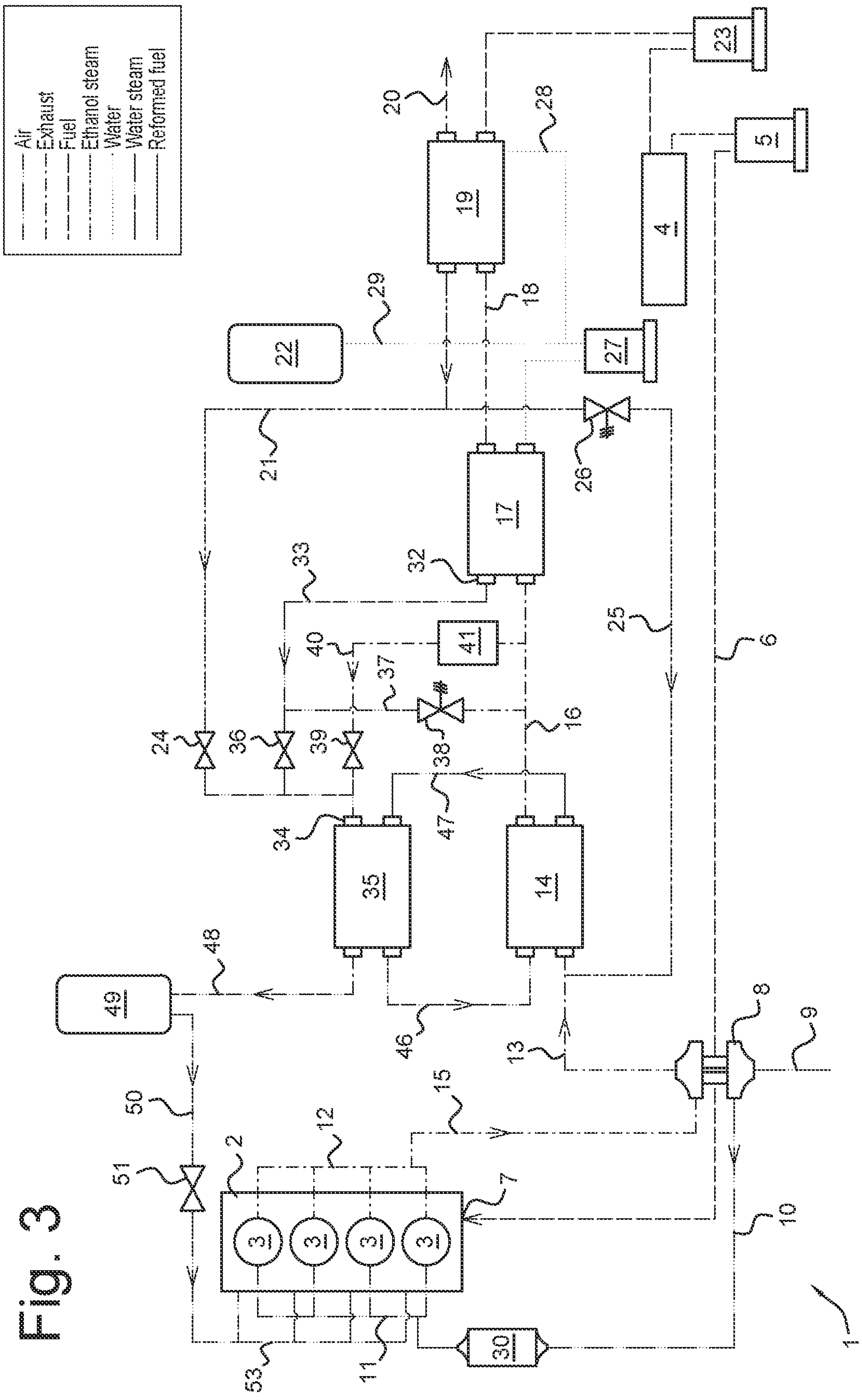
FIG. 3 shows the step of flushing out the exhaust gases in a water steam priming step.

FIG. 3 shows the step of switching from the exhaust gas purging to priming the fuel reformer unit 14 with only water steam in order to avoid the risk of coking at start-up of the ICE 2, by transporting water steam only through the heat exchanger 35 and the fuel reformer unit 14. When both ethanol and water steam are present at the inlet side of the regulating valves 24 and 36, and a threshold temperature has been reached, the EGR valve 39 is closed and the water steam control valve 36 is opened and water steam is led into the reformer unit 14, to prevent coking when ethanol steam is admitted. The resulting drop in pressure in the recirculation duct 37 causes the regulating valve 38 to close.

The admission of water steam only into the reformer unit 14 can also be carried out under high load conditions of the ICE 2 involving high temperature operating points, for decoking of the reformer unit 14, using water steam to wash out carbon deposits from the reformer unit.

The admission of water steam to the ICE 2 can be carried out to operate the ICE under Humid Air Motor (HAM) conditions with a lambda value of 1 at maximum power output, for reducing NOx formation.

Recirculation of the water steam avoids the risk of coking at start up and ensures that hydrogen that is created in the reforming process and stored in the buffer tank 49, enters a completely oxygen free system.

Reforming Process

Figure 4:
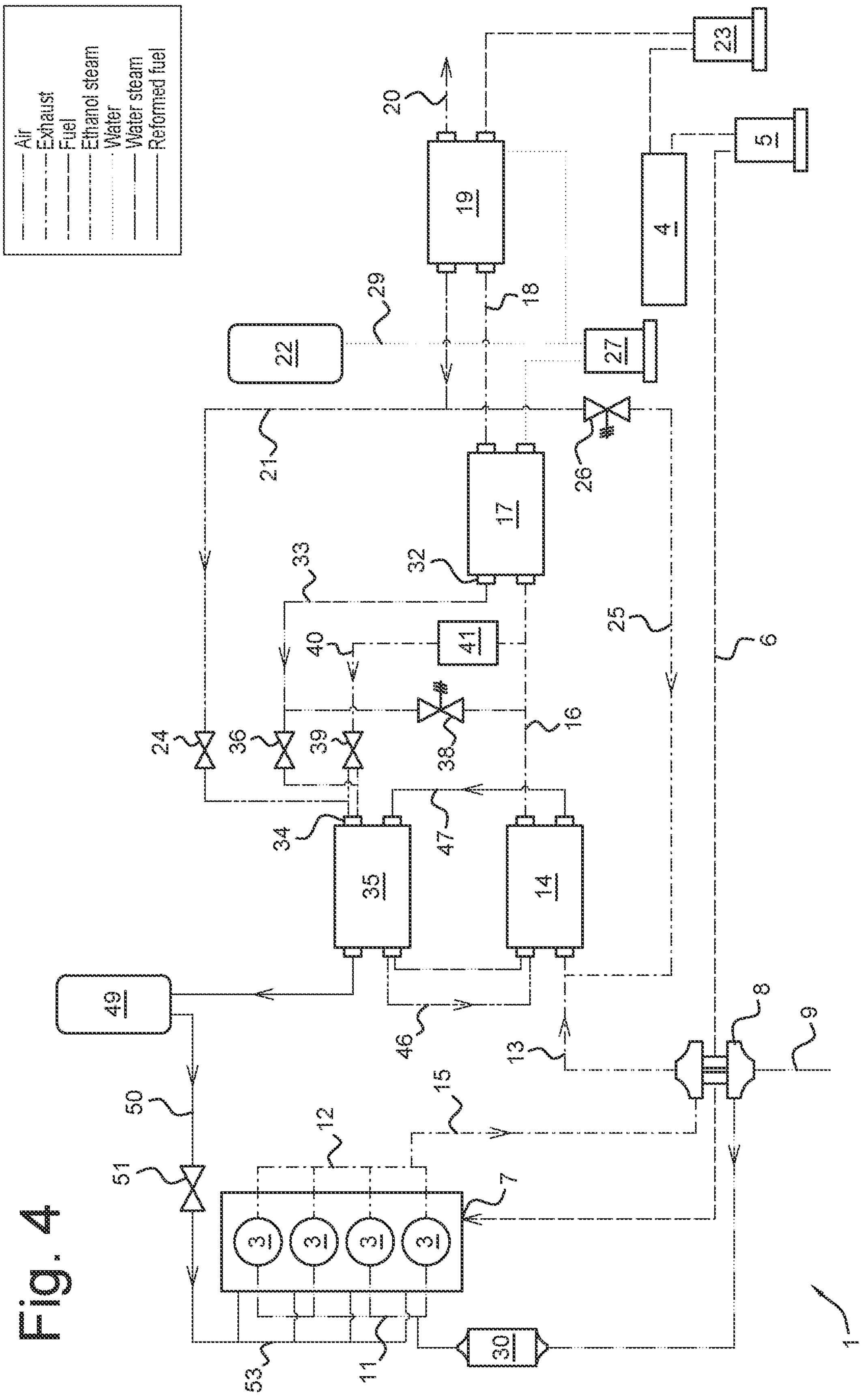
FIG. 4 shows the step of starting the ethanol steam reforming process, and FIG. 5 sows a schematic overview of an ICE assembly with ethanol and water recirculated back to a respective ethanol tank and water tank.

FIG. 4 shows the start of the reforming process, following on priming the system with water steam as described in relation to FIG. 3. At sufficient water saturation and temperatures, the ethanol steam control valve 24 opens, so that ethanol is admitted into the reformer unit 14, and the reforming process starts. The pressure drops in the duct 21 causes the ethanol regulating valve 26 to close.

FIG. 5 shows an internal combustion engine assembly 1 with an ethanol tank 60 that is connected via a duct 61 and a pump 62 to an evaporator 63. The evaporator 63 is in heat exchanging contact with the water steam that is formed in the water evaporator 17. The ethanol steam is fed via the ethanol steam duct 21 and control valve 24 to the pre-heater/cooler unit 35. Via the pressure release valve 26, the ethanol recirculation duct 67 leads via a condenser 66 to the tank 60 so that during the EGR purging and the steam priming steps during start-up, as described in relation to FIGS. 2 and 3, the ethanol is collected in the tank 60.

The water steam that is formed in evaporator 17 is fed through the evaporator 63, and from there via the control valve 36 to the heat exchanger 35 and the reformer unit 14. During the EGR purging step, the recirculated steam is admitted by the pressure release valve 38 into the duct 70, to a condenser 71 and from there on via a duct 72 back into the water tank 22.

A start sequence of the internal combustion engine assembly 1 in relation to FIG. 5, includes the following steps:

starting of the engine 2 and reaching a stable lambda 1 operation, ensure that no oxygen is present in exhaust gas using the lambda sensor (not shown), opening of the EGR valve 39 to purge the system from oxygen with cold inert ($N_2$ and $CO_2$) exhaust gas while waiting for steam. The lambda sensor may be used to confirm that the $H_2$ gas is purged completely from the system, starting of the water pump 27 to form water steam that increases the pressure in the water steam recirculation duct 33 until the release valve 38 opens at a preset threshold pressure. Recirculation of water steam through the condenser 71, back to the tank 22, until the temperature is sufficient to start the evaporation of ethanol, starting of the ethanol pump 23,62 to form ethanol steam that increases the pressure in the ethanol steam recirculation duct 21 until the release valve 26 opens at a preset threshold pressure. Recirculation of ethanol steam through condenser 66, back to tank 60 until the temperatures in the fuel reformer is sufficient, closing of the EGR valve 39 and opening of the water steam control valve 36 to avoid coking of Ethanol in the hot fuel reformer unit 14, and opening of the ethanol steam control valve 24 to start the fuel reforming process.

A stopping sequence may include:

closing of the ethanol steam valve 24 first for the fuel reformer process to stop. The remaining high pressure ethanol steam is recirculated through the condenser 71 back to the tank 22 until the pressure is reduced, closing the water steam valve 36 after a set time period to ensure full conversion of remaining ethanol in the hot fuel reformer unit 14, 35. The high-pressure water steam is recirculated through the condenser 71 back to the tank 22 until pressure is reduced, opening of EGR valve 39 and purging the hydrogen until it has been fully burned in the ICE, lowering of the mass flow of the ethanol pump 62 until the ethanol steam pressure is lowered such that the release valve 26 closes and the pump 62 can be stopped, lowering of the mass flow of the water pump 27 until the water steam pressure is lowered such that the release valve 38 closes and pump 27 can be stopped, and stopping of the ICE 2 when the purging step has removed any remaining hydrogen in the system.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims.

The invention claimed is:

1. An internal combustion engine assembly comprising:

a fuel tank, connected via a fuel supply duct to a first fuel inlet of at least one of a number of cylinders, the cylinders being with an outlet connected to an exhaust system, exhaust gases from the exhaust system being in heat exchanging contact with a reformer unit for steam reforming of alcohol, the reformer unit being with a reformer outlet connected to a second fuel inlet of the cylinders for supplying hydrogen to the second fuel inlet, an alcohol evaporator that is in heat exchanging contact with the exhaust gases and that is with an inlet connected to an alcohol supply unit and with an outlet connected to a first reformer supply duct that is connected to an inlet of the reformer unit via a first control valve, for supplying alcohol steam to the reformer unit, a water evaporator that is in heat exchanging contact with the exhaust gases and that is with an inlet connected to a water tank and that is with an outlet connected to a second reformer supply duct that is connected to the inlet of the reformer unit via a second control valve for supplying water steam to the reformer unit, and a reformer purge duct extending from the exhaust system to the inlet of the reformer unit via a purge control valve, adapted for feeding exhaust gases into the reformer unit and via the reformer outlet to the second fuel inlet of the cylinders.

2. The internal combustion engine assembly according to claim 1, the alcohol supply unit comprising the fuel tank, the fuel tank being adapted for containing alcohol.

3. The internal combustion engine assembly according to claim 1, the alcohol supply unit comprising a tank for containing alcohol.

4. The internal combustion engine assembly according to claim 3, the outlet of the alcohol evaporator being connected to the tank via a condenser.

5. The internal combustion engine assembly according to claim 1, the reformer outlet being connected to a buffer tank for storing reformed fuel, the buffer tank being with an outlet connected to the second fuel inlet of the cylinders.

6. The internal combustion engine assembly according to claim 1, the alcohol comprising ethanol.

7. The internal combustion engine assembly according to claim 1, a cooler being provided in the exhaust purge duct.

8. The internal combustion engine assembly according to claim 1, the first reformer supply duct being connected to an alcohol recirculation duct via a pressure control valve that opens at a pressure exceeding a predetermined threshold value, the recirculation duct being connected to the exhaust system, upstream of the reformer unit, or to the fuel tank.

9. The internal combustion engine assembly according to claim 1, the second reformer supply duct being connected to a water outflow duct that is connected to the exhaust system, via a pressure control valve that opens at a pressure exceeding a predetermined threshold value, or that is connected to the water tank via a pressure control valve and a condenser.

10. The internal combustion engine assembly according to claim 9, the water outflow duct being connected to the exhaust system, downstream of the reformer unit.

11. The internal combustion engine assembly according to claim 9, the water outflow duct being connected to the water tank via the condenser.

12. The internal combustion engine assembly according to claim 1, an ejector-shaped nozzle being provided at the second fuel inlet of the cylinders.

13. An internal combustion engine assembly comprising:

a fuel tank, connected via a fuel supply duct to a first fuel inlet of at least one of a number of cylinders, the cylinders being with an outlet connected to an exhaust system, exhaust gases from the exhaust system being in heat exchanging contact with a reformer unit for steam reforming of alcohol, the reformer unit being with a reformer outlet connected to a second fuel inlet of the cylinders for supplying hydrogen to the second fuel inlet, an alcohol evaporator that is in heat exchanging contact with the exhaust gases and that is with an inlet connected to an alcohol supply unit and with an outlet connected to a first reformer supply duct that is connected to an inlet of the reformer unit via a first control valve, for supplying alcohol steam to the reformer unit, a water evaporator that is in heat exchanging contact with the exhaust gases and that is with an inlet connected to a water tank and that is with an outlet connected to a second reformer supply duct that is connected to the inlet of the reformer unit via a second control valve for supplying water steam to the reformer unit, a reformer purge duct extending from the exhaust system to the inlet of the reformer unit via a purge control valve, adapted for feeding exhaust gases into the reformer unit and via the reformer outlet to the second fuel inlet of the cylinders, and a controller adapted to carry out a start sequence comprising:

starting combustion of fuel in the cylinders, opening of the purge control valve to flow exhaust gases through the reformer unit, a buffer tank and the cylinders for removal of $O_2$, start producing of alcohol steam and water steam until the pressures in the first and second reformer supply ducts reach a respective predetermined value, closing of the purge control valve and opening of the second control valve to flow water steam through the reformer unit and the buffer tank, and opening the first control valve to start the process of fuel reforming in the reformer unit.

14. The internal combustion engine assembly according to claim 13, the controller being adapted to carry out a stop sequence comprising:

closing the first control valve, recirculating ethanol steam via the pressure control valve to the exhaust system or to the water tank, closing the second control valve after a predetermined time, recirculating water steam via the pressure control valve to the exhaust system or to the water tank, opening the purge control valve and recirculating exhaust gases through the reformer unit and the buffer tank, and stopping the combustion of fuel in the cylinders.

15. A vehicle comprising:

an internal combustion engine assembly comprising:

a fuel tank, connected via a fuel supply duct to a first fuel inlet of at least one of a number of cylinders, the cylinders being with an outlet connected to an exhaust system, exhaust gases from the exhaust system being in heat exchanging contact with a reformer unit for steam reforming of alcohol, the reformer unit being with a reformer outlet connected to a second fuel inlet of the cylinders for supplying hydrogen to the second fuel inlet, an alcohol evaporator that is in heat exchanging contact with the exhaust gases and that is with an inlet connected to an alcohol supply unit and with an outlet connected to a first reformer supply duct that is connected to an inlet of the reformer unit via a first control valve, for supplying alcohol steam to the reformer unit, a water evaporator that is in heat exchanging contact with the exhaust gases and that is with an inlet connected to a water tank and that is with an outlet connected to a second reformer supply duct that is connected to the inlet of the reformer unit via a second control valve for supplying water steam to the reformer unit, and a reformer purge duct extending from the exhaust system to the inlet of the reformer unit via a purge control valve, adapted for feeding exhaust gases into the reformer unit and via the reformer outlet to the second fuel inlet of the cylinders.

16. A method of operating a vehicle comprising an internal combustion engine assembly comprising:

a fuel tank, connected via a fuel supply duct to a first fuel inlet of at least one of a number of cylinders, the cylinders being with an outlet connected to an exhaust system, exhaust gases from the exhaust system being in heat exchanging contact with a reformer unit for steam reforming of alcohol, the reformer unit being with a reformer outlet connected to a second fuel inlet of the cylinders for supplying hydrogen to the second fuel inlet, an alcohol evaporator that is in heat exchanging contact with the exhaust gases and that is with an inlet connected to an alcohol supply unit and with an outlet connected to a first reformer supply duct that is connected to an inlet of the reformer unit via a first control valve, for supplying alcohol steam to the reformer unit, a water evaporator that is in heat exchanging contact with the exhaust gases and that is with an inlet connected to a water tank and that is with an outlet connected to a second reformer supply duct that is connected to the inlet of the reformer unit via a second control valve for supplying water steam to the reformer unit, and a reformer purge duct extending from the exhaust system to the inlet of the reformer unit via a purge control valve, adapted for feeding exhaust gases into the reformer unit and via the reformer outlet to the second fuel inlet of the cylinders, the method comprising performing a starting sequence comprising:

starting of the at least one of the number of cylinders until reaching a lambda of 1, opening of the purge control valve and feeding inert exhaust gases via the reformer unit to the cylinders to purge the system with inert exhaust gas, closing of the purge control valve after a predetermined period of time, supplying water steam to the reformer unit to prime the reformer unit with water and avoid coke forming in the reformer unit, and supplying alcohol steam to the reformer unit to start the fuel reforming process.

17. The method according to claim 16, further comprising performing a stopping sequence comprising:

stopping supply of ethanol to the reformer unit, for de-carbonization of the reformer unit during a predetermined period of time, stopping supply of water to the reformer unit, opening of the purge control valve and feeding exhaust gases via the reformer unit to the cylinders to purge the system with inert exhaust gas, and stopping of the combustion engine when the purging step has removed remaining oxygen in the fuel reformer.

* * * * *